US012002139B2

(12) United States Patent
Navarro et al.

(10) Patent No.: US 12,002,139 B2
(45) Date of Patent: Jun. 4, 2024

(54) ROBUST FACIAL ANIMATION FROM VIDEO USING NEURAL NETWORKS

(71) Applicant: Roblox Corporation, San Mateo, CA (US)

(72) Inventors: Inaki Navarro, Zurich (CH); Dario Kneubuhler, Zurich (CH); Tijmen Verhulsdonck, Gothenburg (SE); Eloi Du Bois, Austin, TX (US); Will Welch, San Francisco, CA (US); Vivek Verma, Oakland, CA (US); Ian Sachs, Corte Madera, CA (US); Kiran Bhat, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 145 days.

(21) Appl. No.: 17/677,123

(22) Filed: Feb. 22, 2022

(65) Prior Publication Data

US 2022/0270314 A1 Aug. 25, 2022

Related U.S. Application Data

(60) Provisional application No. 63/152,819, filed on Feb. 23, 2021, provisional application No. 63/152,327, filed on Feb. 22, 2021.

(51) Int. Cl.
*G06T 13/40* (2011.01)
*G06T 7/73* (2017.01)
(Continued)

(52) U.S. Cl.
CPC ............... *G06T 13/40* (2013.01); *G06T 7/73* (2017.01); *G06V 10/24* (2022.01); *G06V 10/774* (2022.01);
(Continued)

(58) Field of Classification Search
CPC . G06T 13/40; G06T 7/73; G06T 2207/20081; G06T 2207/20084; G06T 2207/30201; G06V 40/174; G06V 40/171; G06V 10/24; G06V 10/82; G06V 40/161; G06V 10/774
See application file for complete search history.

(56) References Cited

U.S. PATENT DOCUMENTS 9,786,084 B1 10/2017 Bhat et al.
10,062,198 B2 8/2018 Bhat et al.
(Continued)

OTHER PUBLICATIONS

WIPO, International Search Report for International Patent Application No. PCT/US2022/017381, dated Jun. 15, 2022, 2 pages.
(Continued)

*Primary Examiner* — Xin Sheng
(74) *Attorney, Agent, or Firm* — IP Spring

(57) ABSTRACT

Implementations described herein relate to methods, systems, and computer-readable media to generate animations for a 3D avatar from input video captured at a client device. A camera may capture video of a face while a trained face detection model and a trained regression model output a set of FACS weights, head poses, and facial landmarks to be translated into the animations of the 3D avatar. Additionally, a higher level-of-detail may be intelligently selected based upon user preferences and/or computing conditions at the client device.

20 Claims, 8 Drawing Sheets

(51) Int. Cl.
  *G06V 10/24* (2022.01)
  *G06V 10/774* (2022.01)
  *G06V 10/82* (2022.01)
  *G06V 40/16* (2022.01)

(52) U.S. Cl.
  CPC ............ *G06V 10/82* (2022.01); *G06V 40/161* (2022.01); *G06V 40/171* (2022.01); *G06V 40/174* (2022.01); *G06T 2207/20081* (2013.01); *G06T 2207/20084* (2013.01); *G06T 2207/30201* (2013.01)

(56) References Cited

U.S. PATENT DOCUMENTS

| | | | |
|---|---|---|---|
| 10,169,905 | B2 | 1/2019 | Bhat et al. |
| 10,198,845 | B1 | 2/2019 | Bhat et al. |
| 10,559,111 | B2 | 2/2020 | Sachs et al. |
| 2009/0196464 | A1* | 8/2009 | Dimitrova ............ G06V 10/764 382/118 |
| 2019/0080155 | A1* | 3/2019 | Ganong ................ G06V 40/167 |
| 2020/0272806 | A1* | 8/2020 | Walker ................ G06V 40/167 |
| 2020/0402284 | A1* | 12/2020 | Saragih ................ G06V 10/82 |
| 2021/0027511 | A1 | 1/2021 | Shang et al. |

OTHER PUBLICATIONS

WIPO, Written Opinion for International Patent Application No. PCT/US2022/017381, dated Jun. 15, 2022, 9 pages.

Cudeiro, et al., "Capture, Learning, and Synthesis of 3D Speaking Styles", Computer Vision and Pattern Recognition (CVPR) 2019, Long Beach, CA, 2019, 4 pages.

Honari, et al., "Improving Landmark Localization with Semi-Supervised Learning", CVPR 2018, Computer Vision and Pattern Recognition (cs.CV), https://arxiv.org/abs/1709.01591v7, 2018, 17 pages.

Zhang, et al., "Joint Face Detection and Alignment using Multi-task Cascaded Convolutional Networks", CoRRabs/1604.02878 (2016). arXiv:1604.02878 http://arxiv.org/abs/1604.02878, 2016, 5 pages.

* cited by examiner

ROBUST FACIAL ANIMATION FROM VIDEO USING NEURAL NETWORKS

CROSS-REFERENCE TO RELATED PATENT APPLICATIONS

The present application claims the benefit of priority to U.S. Provisional Patent Application Ser. No. 63/152,327, entitled "Real Time Robust Facial Animation From Video," filed on Feb. 22, 2021, and U.S. Provisional Patent Application Ser. No. 63/152,819, entitled "Real Time Robust Facial Animation From Video," filed on Feb. 23, 2021, the entire contents of each of which are hereby incorporated by reference herein.

TECHNICAL FIELD

Embodiments relate generally to computer-based virtual experiences, and more particularly, to methods, systems, and computer readable media for robust facial animation from video in real-time.

BACKGROUND

Some online platforms (e.g., gaming platforms, media exchange platforms, etc.), allow users to connect with each other, interact with each other (e.g., within a game), create games, and share information with each other via the Internet. Users of online platforms may participate in multiplayer gaming environments or virtual environments (e.g., three-dimensional environments), design custom gaming environments, design characters and avatars, decorate avatars, exchange virtual items/objects with other users, communicate with other users using audio or text messaging, and so forth. Environments such as metaverse or multiverse environments can also enable users that participate to share, sell, or trade objects of their creation with other users.

Users interacting with one another may use interactive interfaces that include presentation of a user's avatar. Animating the avatar may conventionally include having a user input requested gestures, movements, and other similar preconfigured animation details, and presenting an animation based on the user's input. Such conventional solutions suffer drawbacks, and some implementations were conceived in light of the above.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to automatically creating robust facial animation from video in real-time. According to one aspect, a computer-implemented method comprises: identifying, using a fully convolutional network, a set of bounding box candidates from a first frame of a video, wherein each bounding box candidate includes a face; refining, using a convolutional neural network, the set of bounding box candidates into a bounding box; obtaining a first set of one or more of a predefined facial expression weight, a head pose, and facial landmarks based on the bounding box and the first frame using an overloaded output convolutional neural network; generating a first animation frame of an animation of a three dimensional (3D) avatar based on the first set of the one or more of the predefined facial expression weight, the head pose, and the facial landmarks, wherein a head pose of the avatar matches the head pose in the first set and facial landmarks of the avatar match the facial landmarks in the first set; and for each additional frame of the video subsequent to the first frame, detecting whether the bounding box, applied to the additional frame, includes the face; if it is detected that the bounding box includes the face, obtaining an additional set of the one or more predefined facial expression weights, head poses, and facial landmarks based on the bounding box and the additional frame, using the overloaded output convolutional neural network; and generating an additional animation frame of the animation of the 3D avatar using the additional set.

Various implementations and variations of the computer-implemented method are disclosed.

In some implementations, if it is detected that the bounding box for the additional frame does not include the face, setting the additional frame as the first frame.

In some implementations, the computer-implemented method further comprises identifying, by the overloaded output convolutional neural network, a tongue out condition wherein a tongue is detected in the face.

In some implementations, identifying the tongue out condition is based on sub-model of the overloaded output convolutional neural network.

In some implementations, the overloaded output convolutional network is a first neural network, the method further comprising refining the first set of one or more of the predefined facial expression weight, the head pose, and the facial landmarks based on the bounding box and the first frame using an additional overloaded output convolutional neural network.

In some implementations, the additional overloaded output convolutional neural network provides a higher level of detail as compared to the first neural network.

In some implementations, the computer-implemented method further comprises, identifying, by the additional overloaded output convolutional neural network, a tongue out condition wherein a tongue is detected in the face.

In some implementations, an input frame resolution of the first neural network is less than an input frame resolution of the additional overloaded output convolutional neural network.

In some implementations, the overloaded output convolutional neural network is trained on a set of artificially generated input frames of an artificial video.

In some implementations, the overloaded output convolutional neural network is further trained with a set of real images that are hand-labeled According to another aspect, a system is provided. The system comprising: a memory with instructions stored thereon; and a processing device, coupled to the memory, the processing device configured to access the memory and execute the instructions, wherein the instructions cause the processing device to perform operations comprising: identifying, using a fully convolutional network, a set of bounding box candidates from a first frame of a video, wherein each bounding box candidate includes a face; refining, using a convolutional neural network, the set of bounding box candidates into a bounding box; obtaining a first set of one or more of a predefined facial expression weight, a head pose, and facial landmarks based on the bounding box and the first frame using an overloaded output convolutional neural network; generating a first animation frame of an animation of a three dimensional (3D) avatar based on the first set of the one or more of the predefined facial expression weight, the head pose, and the facial landmarks, wherein a head pose of the avatar matches the head pose in the first set and facial landmarks of the avatar match the facial landmarks in the first set; and for each additional frame of the video subsequent to the first frame, detecting whether the bounding box, applied to the additional frame, includes the face; if it is detected that the bounding box includes the face, obtaining an additional set of the one or more predefined facial expression weights, head poses, and facial landmarks based on the bounding box and the additional frame, using the overloaded output convolutional neural network; and generating an additional animation frame of the animation of the 3D avatar using the additional set.

Various implementations and variations of the system are disclosed.

In some implementations, if it is detected that the bounding box for the additional frame does not include the face, setting the additional frame as the first frame.

In some implementations, the operations further comprise identifying, by the overloaded output convolutional neural network, a tongue out condition wherein a tongue is detected in the face.

In some implementations, the overloaded output convolutional network is a first neural network, the operations further comprising additionally refining the first set of one or more of the predefined facial expression weight, the head pose, and facial landmarks based on the bounding box and the first frame using an additional overloaded output convolutional neural network.

In some implementations, the additional overloaded output convolutional neural network provides a higher level of detail as compared to the first neural network.

According to another aspect, a non-transitory computer-readable medium is provided. The non-transitory computer-readable medium with instructions stored thereon that, responsive to execution by a processing device, causes the processing device to perform operations comprising: identifying, using a fully convolutional network, a set of bounding box candidates from a first frame of a video, wherein each bounding box candidate includes a face; refining, using a convolutional neural network, the set of bounding box candidates into a bounding box; obtaining a first set of one or more of a predefined facial expression weight, a head pose, and facial landmarks based on the bounding box and the first frame using an overloaded output convolutional neural network; generating a first animation frame of an animation of a three dimensional (3D) avatar based on the first set of the one or more of the predefined facial expression weight, the head pose, and the facial landmarks, wherein a head pose of the avatar matches the head pose in the first set and facial landmarks of the avatar match the facial landmarks in the first set; and for each additional frame of the video subsequent to the first frame, detecting whether the bounding box, applied to the additional frame, includes the face; if it is detected that the bounding box includes the face, obtaining an additional set of the one or more predefined facial expression weights, head poses, and facial landmarks based on the bounding box and the additional frame, using the overloaded output convolutional neural network; and generating an additional animation frame of the animation of the 3D avatar using the additional set.

Various implementations and variations of the non-transitory computer-readable medium are disclosed.

In some implementations, if it is detected that the bounding box for the additional frame does not include the face, setting the additional frame as the first frame.

In some implementations, the operations further comprise identifying, by the overloaded output convolutional neural network, a tongue out condition wherein a tongue is detected in the face.

In some implementations, the overloaded output convolutional network is a first neural network, the operations further comprising additionally refining the first set of one or more of the predefined facial expression weight, the head pose, and facial landmarks based on the bounding box and the first frame using an additional overloaded output convolutional neural network.

In some implementations, the additional overloaded output convolutional neural network provides a higher level of detail as compared to the first neural network.

DETAILED DESCRIPTION

Figure 1:
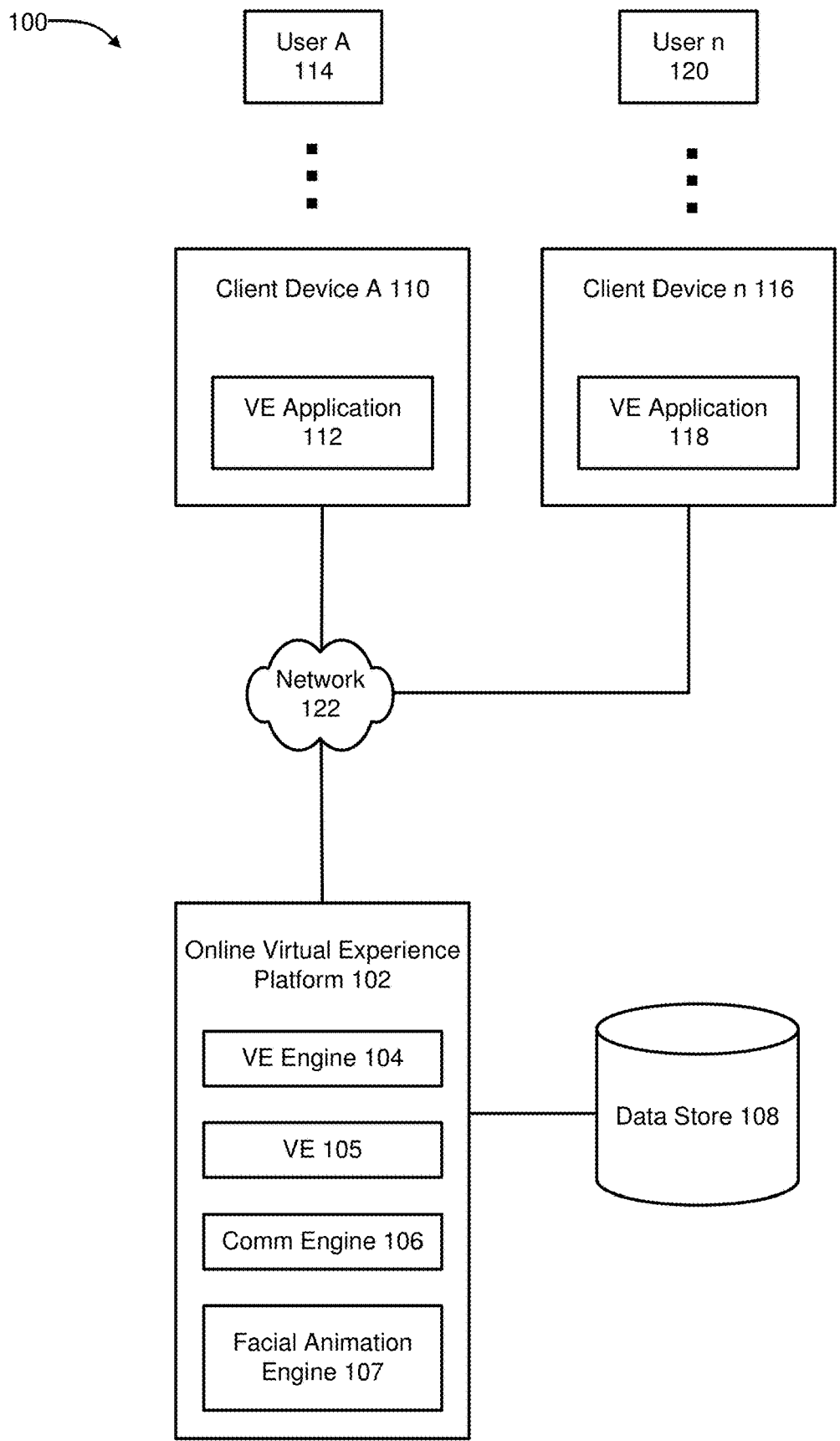
FIG. 1 is a diagram of an example network environment, in accordance with some implementations.

One or more implementations described herein relate to real-time robust animation from video. Features can include automatically creating an animation of a three dimensional (3D) avatar, based upon input video received from a client device.

Features described herein provide automatic detection of faces in video, regression of parameters used to animate a 3D avatar from the detected faces, and creation of an animation of the 3D avatar based on the parameters. A face detection model is trained to accurately identify a bounding box and provide predicted parameters. Similarly, a regression model is trained to accurately produce parameters representative of a user's face based upon the predicted parameters. Thereafter, the trained models may be used to identify a face in an input video and create a robust animation of a 3D avatar based on the video.

The trained models may be deployed at client devices for use by user's desiring to have automatically created animation for their associated avatars. The client devices may further be configured to be in operative communication with online platforms, such as a virtual experience platform, whereby their associated avatars may be richly animated for presentation in communication interfaces (e.g., video chat), within virtual experiences (e.g., richly animated faces on a representative virtual body), within animated videos transmitted to other users (e.g., by sending recordings of the animated avatars through a chat function or other functionality), and within other portions of the online platforms.

Online virtual experience platforms (also referred to as "user-generated content platforms" or "user-generated content systems") offer a variety of ways for users to interact with one another. For example, users of an online virtual experience platform may create experiences, games, or other content or resources (e.g., characters, graphics, items for game play within a virtual world, etc.) within the platform.

Users of an online virtual experience platform may work together towards a common goal in a game or in game creation, share various virtual items, send electronic messages to one another, and so forth. Users of an online virtual experience platform may interact with an environment, play games, e.g., including characters (avatars) or other game objects and mechanisms. An online virtual experience platform may also allow users of the platform to communicate with each other. For example, users of the online virtual experience platform may communicate with each other using voice messages (e.g., via voice chat), text messaging, video messaging, or a combination of the above. Some online virtual experience platforms can provide a virtual three-dimensional environment in which users can represent themselves using an avatar or virtual representation of themselves.

In order to help enhance the entertainment value of an online virtual experience platform, the platform can provide an animation engine to facilitate automatically animating avatars. The animation engine may allow users to request or select options for animation, including, for example, animation of a face or body of an avatar based upon a live video-feed transmitted from the client device.

For example, a user can allow camera access by an application on the user device associated with the online virtual experience platform. The video created at the camera may be interpreted to extract gestures or other information that facilitates animation of the avatar based upon the extracted gestures. Similarly, users may augment facial animation through input of directed controls to move other body parts or exaggerate facial gestures.

However, in conventional solutions, video processing is limited due to lack of sufficient computing resources on many mobile client devices. For example, many users may use portable computing devices (e.g., ultra-light portables, tablets, mobile phones, etc.) that lack sufficient computational power to rapidly interpret gestures to accurately create animations. In these circumstances, many automatic animations may introduce undesirable artifacts such as facial jitter, lack of responsiveness, poor translation of visual cues, and other drawbacks. In these scenarios, a user may be unable to have automatic animations created for them, and may instead be required to have relatively fixed facial features on their avatar, or input control gestures through other means to create the animation.

Thus, while some users may acquire mobile devices or computing devices with sufficient processing power to handle robust animation through conventional solutions, and others may input animation gestures directly, many users may lack these experiences due to utilization of otherwise appropriate devices that lack sufficient computational resources for complex computer vision processing.

FIG. 1: System Architecture

FIG. 1 illustrates an example network environment 100, in accordance with some implementations of the disclosure. The network environment 100 (also referred to as "system" herein) includes an online virtual experience platform 102, a first client device 110, a second client device 116 (generally referred to as "client devices 110/116" herein), all connected via a network 122. The online virtual experience platform 102 can include, among other things, a virtual experience (VE) engine 104, one or more virtual experiences 105, a communication engine 106, a facial animation engine 107, and a data store 108. The client device 110 can include a virtual experience application 112. The client device 116 can include a virtual experience application 118. Users 114 and 120 can use client devices 110 and 116, respectively, to interact with the online virtual experience platform 102.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience platform 102 can include a server having one or more computing devices (e.g., a cloud computing system, a rackmount server, a server computer, cluster of physical servers, virtual server, etc.). In some implementations, a server may be included in the online virtual experience platform 102, be an independent system, or be part of another system or platform.

In some implementations, the online virtual experience platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience platform 102 and to provide a user with access to online virtual experience platform 102. The online virtual experience platform 102 may also include a website (e.g., one or more webpages) or application back-end software that may be used to provide a user with access to content provided by online virtual experience platform 102. For example, users may access online virtual experience platform 102 using the virtual experience application 112/118 on client devices 110/116, respectively.

In some implementations, online virtual experience platform 102 may include a type of social network providing connections between users or a type of user-generated content system that allows users (e.g., end-users or consumers) to communicate with other users via the online virtual experience platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience platform 102 may be a virtual gaming platform. For example, the gaming platform may provide single-player or multi-player games to a community of users that may access or interact with games (e.g., user generated games or other games) using client devices 110/116 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may search for games and game items, and participate in gameplay with other users in one or more games. In some implementations, a game may be played in real-time with other users of the game.

In some implementations, other collaboration platforms can be used with the robust animation features described herein instead of or in addition to online virtual experience platform 102. For example, a social networking platform, video chat platform, messaging platform, user content creation platform, virtual meeting platform, etc. can be used with the robust animation features described herein to facilitate rapid, robust, and accurate representation of a user's facial movements onto a virtual avatar.

In some implementations, "gameplay" may refer to interaction of one or more players using client devices (e.g., 110 and/or 116) within a game or experience (e.g., VE 105) or the presentation of the interaction on a display or other output device of a client device 110 or 116.

One or more virtual experiences 105 are provided by the online virtual experience platform. In some implementations, a virtual experience 105 can include an electronic file that can be executed or loaded using software, firmware or hardware configured to present virtual content (e.g., digital media items) to an entity. In some implementations, a virtual experience application 112/118 may be executed and a virtual experience 105 rendered in connection with a virtual experience engine 104. In some implementations, a virtual experience 105 may have a common set of rules or common goal, and the environments of a virtual experience 105 share the common set of rules or common goal. In some implementations, different virtual experiences may have different rules or goals from one another. Similarly, or alternatively, some virtual experiences may lack goals altogether, with an intent being the interaction between users in any social manner.

In some implementations, virtual experiences may have one or more environments (also referred to as "gaming environments" or "virtual environments" herein) where multiple environments may be linked. An example of an environment may be a three-dimensional (3D) environment. The one or more environments of a virtual experience 105 may be collectively referred to a "world" or "virtual world" or "virtual universe" or "metaverse" herein. An example of a world may be a 3D world of a virtual experience 105. For example, a user may build a virtual environment that is linked to another virtual environment created by another user. A character of the virtual experience may cross the virtual border to enter the adjacent virtual environment.

It may be noted that 3D environments or 3D worlds use graphics that use a three-dimensional representation of geometric data representative of virtual content (or at least present content to appear as 3D content whether or not 3D representation of geometric data is used). 2D environments or 2D worlds use graphics that use two-dimensional representation of geometric data representative of virtual content.

In some implementations, the online virtual experience platform 102 can host one or more virtual experiences 105 and can permit users to interact with the virtual experiences 105 (e.g., search for games, VE-related content, or other content) using a virtual experience application 112/118 of client devices 110/116. Users (e.g., 114 and/or 120) of the online virtual experience platform 102 may play, create, interact with, or build virtual experiences 105, search for virtual experiences 105, communicate with other users, create and build objects (e.g., also referred to as "item(s)" or "game objects" or "virtual game item(s)" herein) of virtual experiences 105, and/or search for objects. For example, in generating user-generated virtual items, users may create characters, decoration for the characters, one or more virtual environments for an interactive experience, or build structures used in a virtual experience 105, among others.

In some implementations, users may buy, sell, or trade virtual objects, such as in-platform currency (e.g., virtual currency), with other users of the online virtual experience platform 102. In some implementations, online virtual experience platform 102 may transmit virtual content to virtual experience applications (e.g., 112, 118). In some implementations, virtual content (also referred to as "content" herein) may refer to any data or software instructions (e.g., virtual objects, experiences, user information, video, images, commands, media item, etc.) associated with online virtual experience platform 102 or virtual experience applications.

In some implementations, virtual objects (e.g., also referred to as "item(s)" or "objects" or "virtual game item(s)" herein) may refer to objects that are used, created, shared or otherwise depicted in virtual experience applications 105 of the online virtual experience platform 102 or virtual experience applications 112 or 118 of the client devices 110/116. For example, virtual objects may include a part, model, character, tools, weapons, clothing, buildings, vehicles, currency, flora, fauna, components of the aforementioned (e.g., windows of a building), and so forth.

It may be noted that the online virtual experience platform 102 hosting virtual experiences 105, is provided for purposes of illustration, rather than limitation. In some implementations, online virtual experience platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 105 may be associated with a particular user or a particular group of users (e.g., a private experience), or made widely available to users of the online virtual experience platform 102 (e.g., a public experience). In some implementations, where online virtual experience platform 102 associates one or more virtual experiences 105 with a specific user or group of users, online virtual experience platform 102 may associated the specific user(s) with a virtual experience 105 using user account information (e.g., a user account identifier such as username and password). Similarly, in some implementations, online virtual experience platform 102 may associate a specific developer or group of developers with a virtual experience 105 using developer account information (e.g., a developer account identifier such as a username and password).

In some implementations, online virtual experience platform 102 or client devices 110/116 may include a virtual experience engine 104 or virtual experience application 112/118. The virtual experience engine 104 can include a virtual experience application similar to virtual experience application 112/118. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.). In some implementations, virtual experience applications 112/118 of client devices 110/116, respectively, may work independently, in collaboration with virtual experience engine 104 of online virtual experience platform 102, or a combination of both.

In some implementations, both the online virtual experience platform 102 and client devices 110/116 execute a virtual experience engine (104, 112, and 118, respectively). The online virtual experience platform 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 105 may have a different ratio between the virtual experience engine functions that are performed on the online virtual experience platform 102 and the virtual experience engine functions that are performed on the client devices 110 and 116.

For example, the virtual experience engine 104 of the online virtual experience platform 102 may be used to generate physics commands in cases where there is a collision between at least two game objects, while the additional virtual experience engine functionality (e.g., generate rendering commands) may be offloaded to the client device 110. In some implementations, the ratio of virtual experience engine functions performed on the online virtual experience platform 102 and client device 110 may be changed (e.g., dynamically) based on interactivity conditions. For example, if the number of users participating in a virtual experience 105 exceeds a threshold number, the online virtual experience platform 102 may perform one or more virtual experience engine functions that were previously performed by the client devices 110 or 116.

For example, users may be interacting with a virtual experience 105 on client devices 110 and 116, and may send control instructions (e.g., user inputs, such as right, left, up, down, user election, or character position and velocity information, etc.) to the online virtual experience platform 102. Subsequent to receiving control instructions from the client devices 110 and 116, the online virtual experience platform 102 may send interaction instructions (e.g., position and velocity information of the characters participating in the virtual experience or commands, such as rendering commands, collision commands, etc.) to the client devices 110 and 116 based on control instructions. For instance, the online virtual experience platform 102 may perform one or more logical operations (e.g., using virtual experience engine 104) on the control instructions to generate interaction instruction for the client devices 110 and 116. In other instances, online virtual experience platform 102 may pass one or more or the control instructions from one client device 110 to other client devices (e.g., 116) participating in the virtual experience 105. The client devices 110 and 116 may use the instructions and render the experience for presentation on the displays of client devices 110 and 116.

In some implementations, the control instructions may refer to instructions that are indicative of in-experience actions of a user's character or avatar. For example, control instructions may include user input to control the in-experience action, such as right, left, up, down, user selection, gyroscope position and orientation data, force sensor data, etc. The control instructions may include character position and velocity information. In some implementations, the control instructions are sent directly to the online virtual experience platform 102. In other implementations, the control instructions may be sent from a client device 110 to another client device (e.g., 116), where the other client device generates play instructions using the local virtual experience engine 104. The control instructions may include instructions to play a voice communication message or other sounds from another user on an audio device (e.g., speakers, headphones, etc.), move a character or avatar, and other instructions.

In some implementations, interaction or play instructions may refer to instructions that allow a client device 110 (or 116) to render movement of elements of a virtual experience, such as a multiplayer game. The instructions may include one or more of user input (e.g., control instructions), character position and velocity information, or commands (e.g., physics commands, rendering commands, collision commands, etc.). As described more fully herein, other instructions may include facial animation instructions extracted through analysis of an input video of a user's face, to direct the animation of a representative virtual face of a virtual avatar, in real-time. Accordingly, while interaction instructions may include input by a user to directly control some body motion of a character, interaction instructions may also include gestures extracted from video of a user.

In some implementations, characters (or virtual objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the virtual experience 105. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character object (e.g., body parts, etc.) but the user may control the character (without the character object) to facilitate the user's interaction with a game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience platform 102. In some implementations, creating, modifying, or customizing characters, other virtual objects, virtual experiences 105, or virtual environments may be performed by a user using a user interface (e.g., a developer interface) and with or without scripting (or with or without an application programming interface (API)). It may be noted that for purposes of illustration, rather than limitation, characters are described as having a humanoid form. It may further be noted that characters may have any form such as a vehicle, animal, inanimate object, or other creative form.

In some implementations, the online virtual experience platform 102 may store characters created by users in the data store 108. In some implementations, the online virtual experience platform 102 maintains a character catalog and experience catalog that may be presented to users via the virtual experience engine 104, virtual experience 105, and/or client device 110/116. In some implementations, the experience catalog includes images of different experiences stored on the online virtual experience platform 102. In addition, a user may select a character (e.g., a character created by the user or other user) from the character catalog to participate in the chosen experience. The character catalog includes images of characters stored on the online virtual experience platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online virtual experience platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the virtual experience application 112 or 118, respectively. In one implementation, the virtual experience application 112 or 118 may permit users to use and interact with online virtual experience platform 102, such as search for a particular experience or other content, control a virtual character in a virtual game hosted by online virtual experience platform 102, or view or upload content, such as virtual experiences 105, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a program) that is installed and executes local to client device 110 or 116 and allows users to interact with online virtual experience platform 102. The virtual experience application may render, display, or present the content (e.g., a web page, a user interface, a media viewer) to a user. In an implementation, the virtual experience application may also include an embedded media player (e.g., a Flash® player) that is embedded in a web page.

According to aspects of the disclosure, the virtual experience application 112/118 may be an online virtual experience platform application for users to build, create, edit, upload content to the online virtual experience platform 102 as well as interact with online virtual experience platform 102 (e.g., play and interact with virtual experience 105 hosted by online virtual experience platform 102). As such, the virtual experience application 112/118 may be provided to the client device 110 or 116 by the online virtual experience platform 102. In another example, the virtual experience application 112/118 may be an application that is downloaded from a server.

In some implementations, a user may login to online virtual experience platform 102 via the virtual experience application. The user may access a user account by providing user account information (e.g., username and password) where the user account is associated with one or more characters available to participate in one or more virtual experiences 105 of online virtual experience platform 102.

In general, functions described as being performed by the online virtual experience platform 102 can also be performed by the client device(s) 110 or 116, or a server, in other implementations if appropriate. In addition, the functionality attributed to a particular component can be performed by different or multiple components operating together. The online virtual experience platform 102 can also be accessed as a service provided to other systems or devices through appropriate application programming interfaces (APIs), and thus is not limited to use in websites.

In some implementations, online virtual experience platform 102 may include a communication engine 106. In some implementations, the communication engine 106 may be a system, application, or module that permits the online virtual experience platform 102 to provide video communication functionality to users, functionality permits the users to experience a virtual chat or virtual video conference using the online virtual experience platform 102 and associated virtual representations of themselves. For example, a user may design and build a virtual avatar, and use the virtual avatar through the chat functionality.

In some implementations, online virtual experience platform 102 may include a facial animation engine 107. In some implementations, the facial animation engine 107 may be a system, application, or module that implements face detection and regression models to create a robust real-time animation of a user's avatar or character face. The animation may be based upon a user's actual face, and as such, may include smiles, blinks, winks, frowns, head poses, and other gestures extracted from an input video of the user's face. While illustrated as being executed directly on the online virtual experience platform 102, it should be understood that face detection and regression models may be implemented on each client device 110, 116, for example.

Hereinafter, components and training of a regression model of the facial animation engine 107 is described more fully with reference to FIG. 2.

Figure 2:
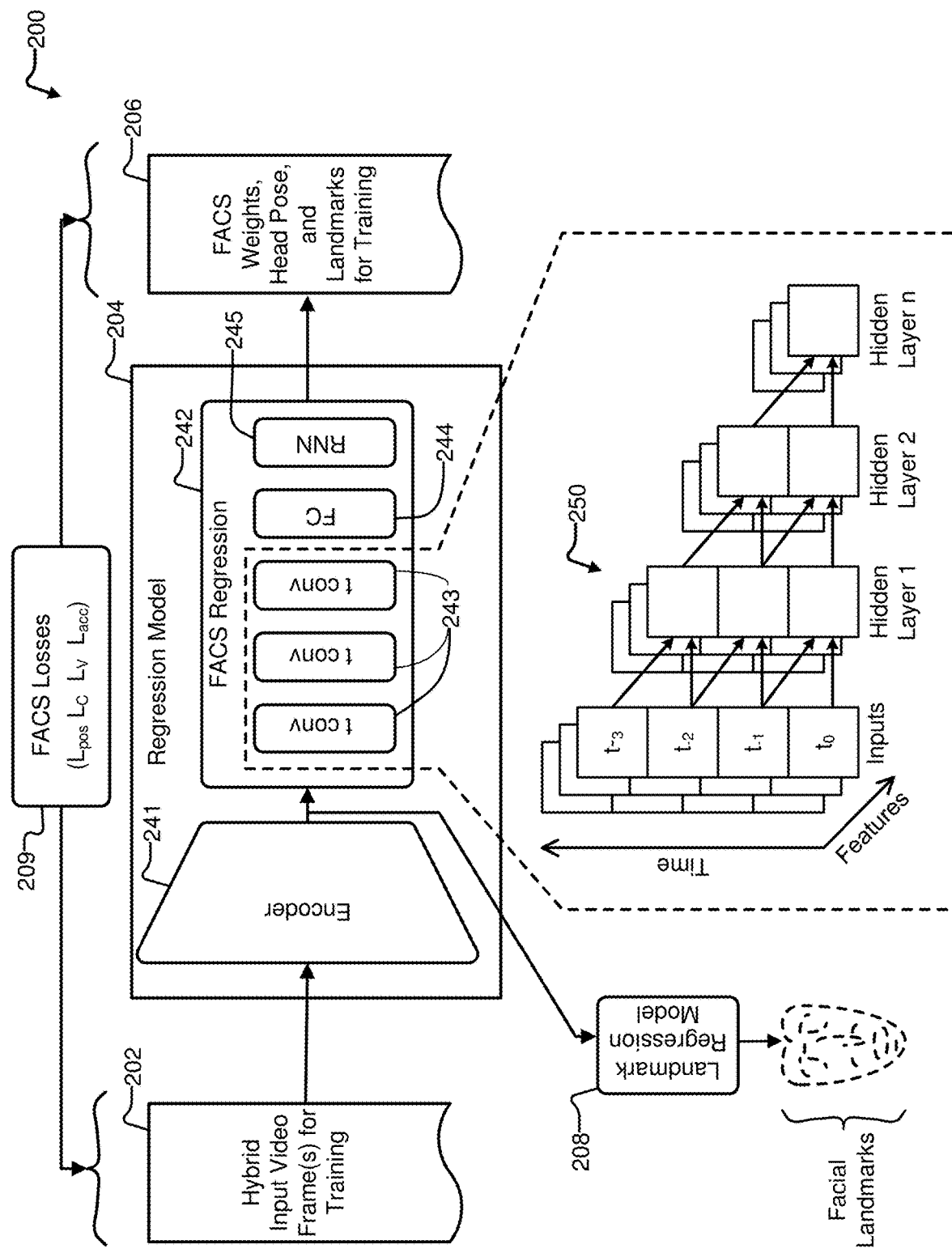
FIG. 2 is a diagram of a training environment for a regression model, in accordance with some implementations.

FIG. 2: Regression Model

FIG. 2 is a diagram of a training environment for a regression model, in accordance with some implementations. As illustrated, a regression model 204 may receive a hybrid labeled data set 202 as input, and may output a set of facial animation coding system (FACS) weights, head poses, and facial landmarks. In this example, the output may be used for training the regression model 204; however, it should be understood that the outputs may also be used for animation of avatars subsequent to initial training.

In general, the regression architecture 200 uses a multi-task setup which co-trains facial landmarks and FACS weights using a shared backbone (e.g., encoder 241) as a facial feature extractor. This arrangement augments the FACS weights learned from synthetic animation sequences with real images that capture the subtleties of facial expression. The FACS regression sub-network 242 is trained alongside a landmark regression model 208. The FACS regression sub-network 242 implements causal convolutions 243. The causal convolutions 243 operate on features over time as opposed to convolutions that only operate on spatial features as found in the encoder 241.

As shown, the input portion of diagram 200 utilizes a training set comprising hybrid input video frames that are part of a labeled training dataset. The hybrid input video frames include both real video frames captured of a live example person, and synthetic frames created using known FACS weights and known head poses (e.g., example avatar faces created using preconfigured FACS weights, poses, etc.). The training set 202 may be replaced with real video after training. The training set 202 may be input into regression model 204 for training purposes.

The regression model 204 includes encoder 241 and FACS regression sub-network 242. The encoder 241 may generally include one or more sub-networks arranged as a convolutional neural network. The one or more sub-networks may include, at least, a two-dimensional (2D) convolutional sub-network (or layer) and a fully connected (FC) convolutional sub-network (or layer). Other arrangements for the encoder 241 may also be applicable.

The FACS regression sub-network may include causal convolutions 243, fully connected (FC) convolutions sub-network 244, and recurrent neural sub-network (RNN) 245. Causal convolutions 243 may operate over high-level features that are accumulated over time. It is noted that as this architecture is suitable for real time applications, an output prediction is computed in the same time period in which the input arrives (i.e., for each input frame there is a need to predict an output before or at about the time the next frame arrives). This means that there can be no use of information from future time-steps (i.e., a normal symmetric convolution would not work). Accordingly, each convolution of causal convolutions 243 operates with a non-symmetric kernel 250 (example kernel size of 2×1) that only takes past information into account and is able to work in real-time scenarios. The causal convolution layers can be stacked like normal convolution layers. The field of view can be increased by either increasing the size of the kernel or by stacking more layers. While the number of layers illustrated is 3, the same may be increased to an arbitrary number of layers.

As additionally illustrated, during training, FACS losses and landmark regression analysis may be used to bolster accuracy of output 206. For example, the regression model 204 may be initially trained using both real and synthetic images. After a certain number of steps, synthetic sequences may be used to learn the weights for the temporal FACS regression subnetwork 242. The synthetic animation training sequences can be created with a normalized rig used for different identities (face meshes) and rendered automatically using animation files containing predetermined FACS weights. These animation files may be generated using either sequences captured by a classic marker-based approach, or, created by an artist directly to fill in for any expression that is missing from the marker-based data. Furthermore, losses are combined to regress landmarks and FACS weights, as shown in blocks 208 and 209.

For example, several different loss terms may be linearly combined to regress the facial landmarks and FACS weights. For facial landmarks, the root mean square error (RMSE) of the regressed positions can be used by landmark regression model 208 to bolster training. Additionally, for FACS weights, the mean squared error (MSE) is utilized by FACS losses regression model 209. As illustrated, the FACS losses and denoted as $L_{pos}$ in regression model 209 utilizes velocity loss (Lv), defined as the MSE between the target and predicted velocities. This encourages overall smoothness of dynamic expressions. In addition, a regularization term on the acceleration (Lacc) is added to reduce FACS weights jitter (and its weight is kept relatively low to preserve responsiveness). An unsupervised consistency loss (Lc) may also be utilized to encourage landmark predictions to be equivariant under different transformations, without requiring landmark labels for a subset of the training images.

Once trained, the regression model 204 may be used to extract FACS weights, head poses, and facial landmarks from an input video (e.g., a live video of a user) for use in animating an avatar. For example, the facial animation engine 107 associated with a client device 110, 116 may take the output FACS weights, head poses, and facial landmarks, and generate individual animation frames based upon the same. The individual animation frames may be arranged in sequence, (e.g., in real-time), to present an avatar with a face that is animated based on the input video.

As described above, the regression model 204 may be implemented in client devices 110, 116 to create animation from input video. A face detection model may be used for the identification FACS weights, head poses, and facial landmarks based on a bounding box, to the regression model 204, as described below.

Figure 3:
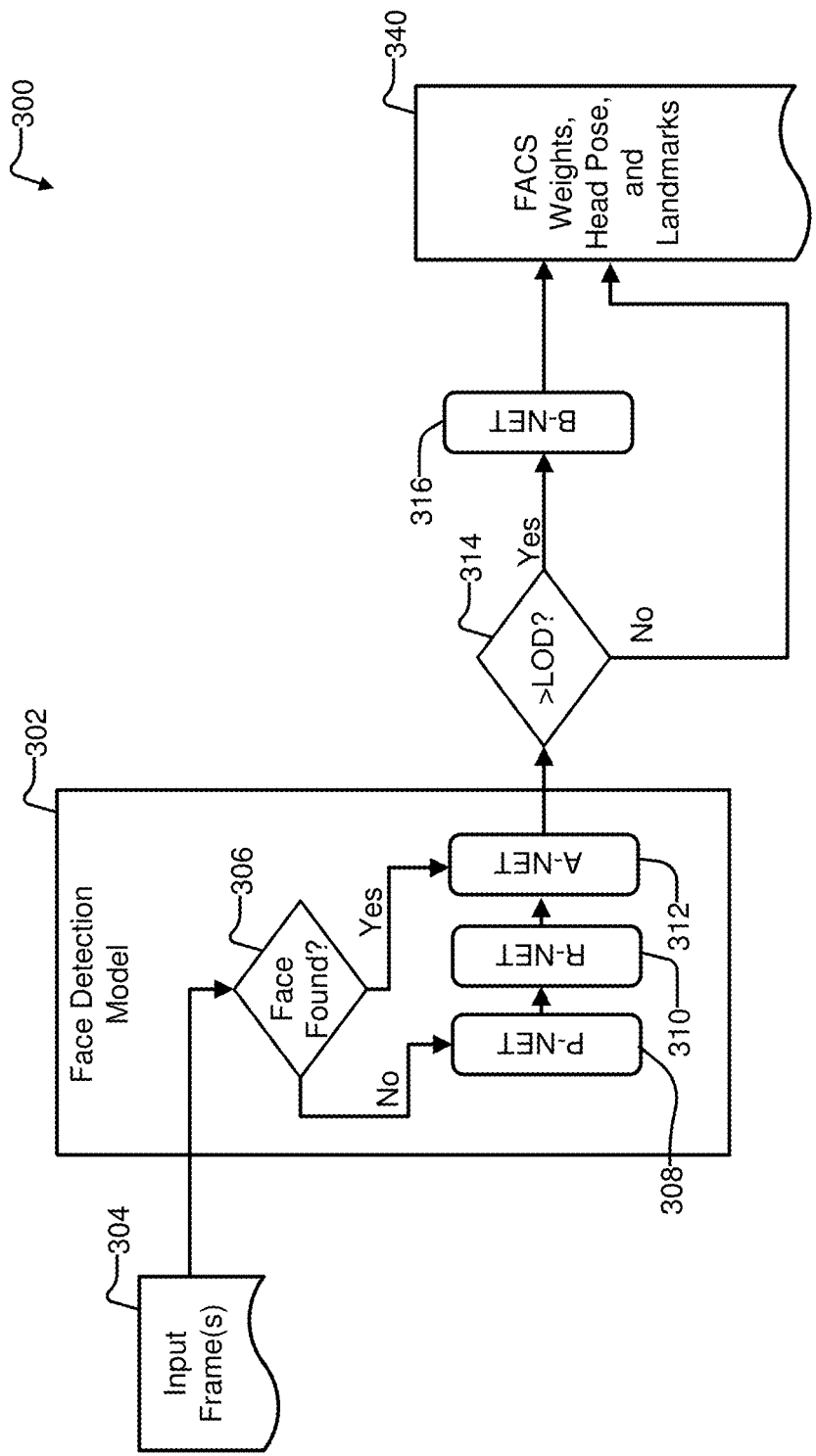
FIG. 3 is a diagram of a face tracking system, in accordance with some implementations.

FIG. 3: Face Detection Model

FIG. 3 is a diagram of an example face tracking system 300 having a face detection model 302 deployed therein, in accordance with some implementations. The Facial Tracking System 300 includes four networks—P-Net 308, R-Net 310, A-Net 312, and B-Net 316, and is configured to produce an output 340 comprising predicted FACS weights, head pose, and facial landmarks for regression.

Generally, P-Net 308 receives a whole input frame 304, at different resolutions, and generates face proposals and/or bounding box candidates. P-Net 308 may also be referred to as a fully convolutional network.

R-Net 310 takes as input proposals/bounding box candidates from P-Net 308. R-Net 310 outputs refined bounding boxes. R-Net 310 may also be referred to as a convolutional neural network.

A-Net 312 receives refined proposals and return face probabilities as well as bounding boxes, FACS weights, head poses, and facial landmarks for regression. In one implementation, the regression may be performed by the regression model 204. B-Net 316 may be similar to A-Net 312, but offer an increased level-of-detail (LOD). In this manner, A-Net 312 may operate with input frames at a different, lower resolution that the B-Net 316.

As illustrated in FIG. 3, an advanced inference decision 306 may be made after a first input frame, which allows the face detection model 302 to circumvent and/or bypass P-Net 308 and R-Net 310, if the face probabilities and/or bounding box output by A-Net 312 indicates a face is detected within the original bounding box. In this manner, several computational steps can be omitted, thereby providing technical benefits including reduced computation time, reduced lag, reduced power usage (that can help conserve battery on battery-powered devices) and improved computational efficiency. As such, face detection model 302 may offer computational efficiency that makes it suitable for use on relatively low computational capacity devices such as smartphones, tablets, or wearable devices. A face detection model comprising P-Net 308, R-Net 310, and A-Net 312 may be usable by relatively low-computational-power mobile devices.

Additionally, during operation, an advanced level-of-detail (LOD) decision 314 may be made after output from A-Net 312 to determine if a higher level-of-detail is appropriate for a particular client device 110, 116. For example, if a client device indicates a lack of available computing resources, a lack of sufficient battery power, or an environment unsuitable for implementing the increased LOD offered by B-Net 316, the entirety of B-Net 316 processing may be omitted on-the-fly. In this manner, the additional computational steps required by B-Net 316 may be omitted, thereby providing technical benefits including reduced computation time, reduced lag, and increased efficiency. As such, face detection model 302 may offer computational efficiency that overcomes the drawbacks of heavy computer vision analysis, and a face detection model comprising P-Net 308, R-Net 310, and A-Net 312 may be executed by relatively low-computational-power mobile devices, or by devices that are under operational conditions that require improved efficiency.

B-Net 316 may be bypassed when one or more conditions are satisfied. For example, such conditions may include low battery reserve, low power availability, high heat conditions, network bandwidth or memory limitations, etc. Appropriate thresholds may be used for each condition. Furthermore, a user-selectable option may be provided allowing a user to direct the face detection model 302 to operate with a lower LOD to provide avatar animation, e.g., within a virtual environment, with low or no impact on device operation.

Both A-Net 312 and B-Net 316 are overloaded output convolutional neural networks. In this regard, each neural network provides a larger number of predicted FACS weights and facial landmarks as compared to a typical output neural network. For example, a typical output network (e.g., O-Net) of a MTCNN may provide as output approximately 5 facial landmarks and a small set of FACS weights. In comparison, both A-Net 312 and B-Net 316 may provide substantially more, e.g., up to or exceeding 175 facial landmarks and several FACS weights. During operation, predicted FACS weights, head poses, and facial landmarks are provided to the regression model 204 (either from A-Net or B-Net) for regression and animation (of the face) of an avatar. It is noted that the regression model 204 may be included in each of A-Net 312 and B-Net 316, such that regression of FACS weights, head poses, and facial landmarks may occur within either implemented output network. Additional description and details related to each of A-Net 312 and B-Net 316 are provided with reference to FIGS. 5A and 5B, respectively.

Hereinafter, additional detail related to the operation of the face detection model 302, and the regression model 204, are provided with reference to FIG. 4.

Figure 4:
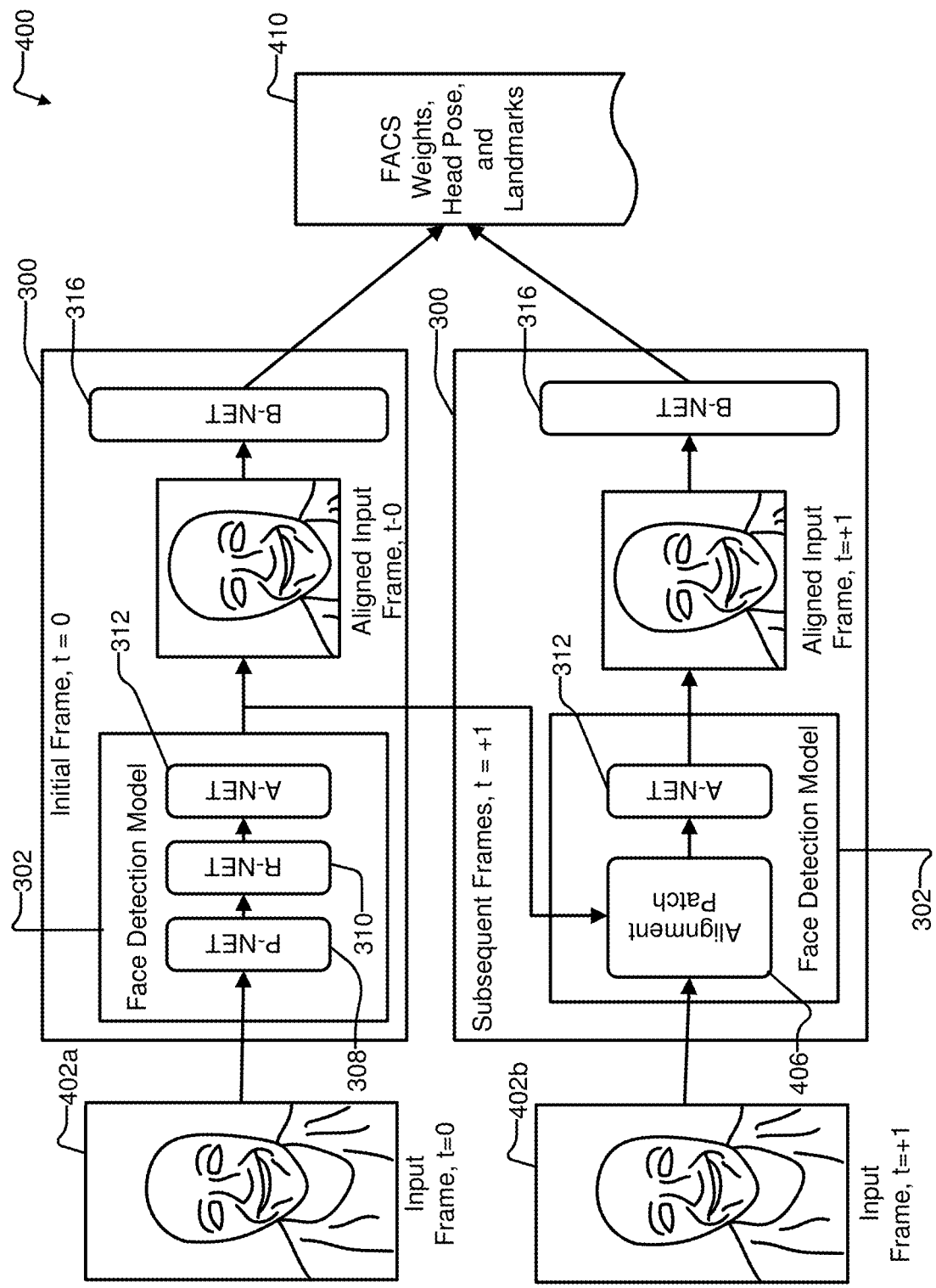
FIG. 4 is a process flow diagram of a regression model and face detection model configured to create a robust animation, in accordance with some implementations.

FIG. 4: Generating an Animation Using Trained Models

FIG. 4 is an example process flow diagram of a regression model 204 and face detection model 302 configured to create an animation of a 3D avatar, in accordance with some implementations. As shown in the process flow 400, an initial input frame 402a (at timestamp t=0) is provided as input to the face detection model 302. In this example, A-Net 312 and optionally B-Net 316 are dynamically selected by active decision 314 and/or alignment patch 406 when determining output LOD. Accordingly, it should be readily understood that this output network may be a combination of A-Net and B-Net architectures and the decision 314. In some implementations, the regression model may implement just one of A-Net or B-Net, e.g., depending on available compute capacity, user settings for the quality of facial animation, etc. In some implementations, decision 314 may be made at runtime with optional utilization of B-Net.

Upon obtaining a refined bounding box or facial landmarks, the input frame is aligned and reduced to outline the identified face. Thereafter, the regression model 204 (a portion of A-net 312 and B-Net 316) takes as input the aligned input frame at t=0, and outputs actual FACS weights, a head pose, and facial landmarks for animation 410.

For subsequent frames 402b (e.g., at timestamp t=+1 and later timestamps), the alignment patch 406 (e.g., based on advanced bypass decision 306), are input directly to the A-Net which determines whether a face is still within the initial bounding box. If the face is still within the initial bounding box, the regression model 204 takes as input the aligned input frame and outputs actual FACS weights, a head pose, and facial landmarks for animation 410 for each subsequent frame where a face is detected within the original bounding box.

In circumstances where a face is not detected within the bounding box, the face detection model 302 may utilize P-Net 308 and R-Net 310 to provide a new bounding box that includes the face.

An overloaded convolutional neural network is used for both A-Net 312 and B-Net 316. Hereinafter, a brief description of A-Net 312 is provided with reference to FIG. 5A, and a brief description of B-Net 316 is provided with reference to FIG. 5B.

FIG. 5: Overloaded Output Networks

Figure 5A:
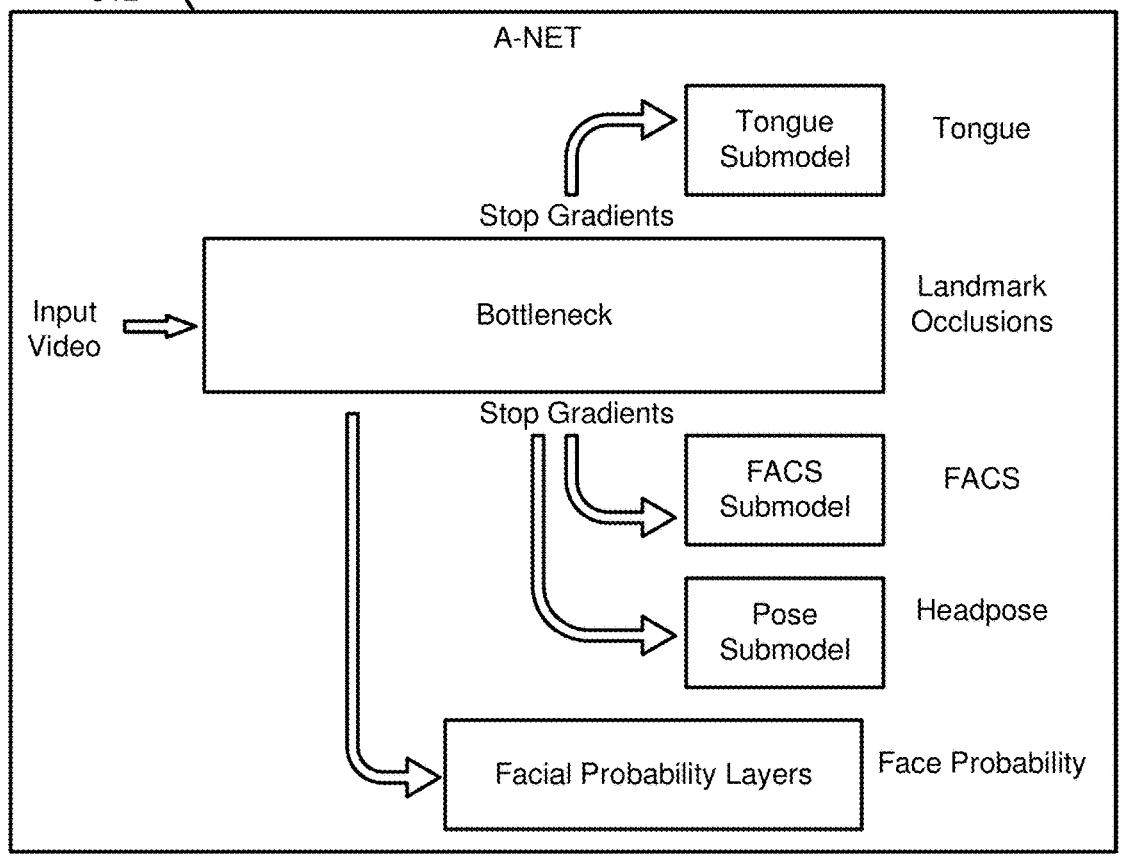
FIGS. 5A and 5B are schematics of example output networks for a face detection model, in accordance with some implementations.
Figure 5B:
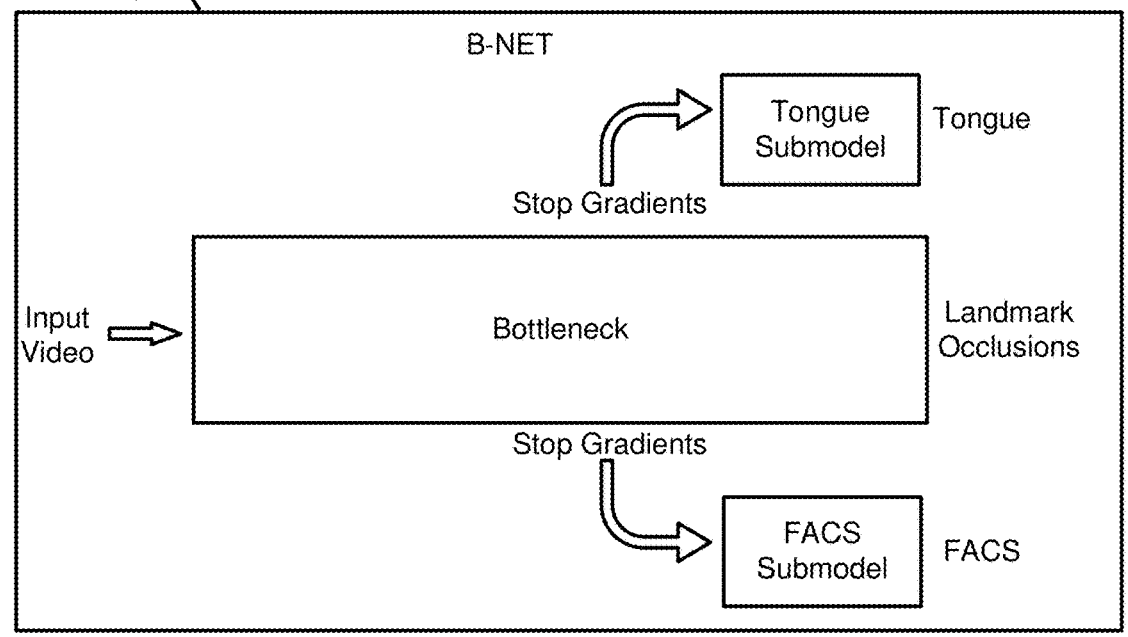

FIGS. 5A and 5B are schematics of example output networks 312 and 316 for face detection model 302, in accordance with some implementations.

As shown in FIG. 5A, A-Net 312 is overloaded convolutional neural network configured to regress head angles and/or head poses. A-Net comprises a tongue submodel configured to detect a tongue outside of a mouth of the face, a FACS submodel to predict FACS weights, a pose submodel to predict head pose or head angle, and a facial probability layer (or layers) to detect a face within a provided bounding box. A-Net is also configured to detect landmark and occlusion information on those landmarks (e.g., physical occlusions present in input video).

A-Net 312 offers several advantages as compared to a typical output network. First, it allows regressing end-to-end head poses directly. To do so, the alignment used to input the images does not apply any rotation (both when the input is calculated from R-Net predicted bounding box or A-Net landmarks). Additionally, it predicts FACS weights and a tongue signal. In addition, it allows prediction of any number of facial landmarks, in this case, over 175 individual contours or landmarks.

A-Net 312 may be trained in phases. Initially, A-Net 312 may be co-trained with encoder 241 that regresses landmarks and occlusions together with a branch which regresses the face probability. For this training, images of faces with annotated landmarks (both real and synthetic) as well as negative examples (image with no face present or if present, with an unusual scale, e.g., extremely large or small part of the image, only a portion of the face within the image, etc.) are used. This portion of the network and the data has no temporal information.

The subsequent phases train the submodels that regress the FACS controls and the head pose angles, and perform the tongue out detection. Since the encoder 241 is not modified during these training phases, the sub-model training can be performed in any order. The FACS weights and head pose submodels can be trained using synthetic sequences with varying expressions and poses, using temporal architectures which allow for temporal filtering and temporal consistency, as well as losses which enforce it. The tongue out submodel can be a simple classifier trained on real images to detect tongue-out conditions.

Turning to FIG. 5B, B-Net may be implemented to provide a higher LOD, enabling a higher quality of facial animation. Generally, B-Net 316 regresses better quality FACS weights and tongue predictions than A-Net 312. The input image is aligned using the landmarks provided in the same frame by A-Net 312. For example, alignment may be performed using procrustes analysis and/or other suitable shape alignment and/or or contour alignment methodologies.

In this example, B-Net 316 follows a similar structure as A-Net 312, but does not provide face probability and head pose, and has a larger capacity. It is trained in the same way as A-Net: first training for landmarks and occlusion information, followed by FACS weights training and tongue out training. B-Net 316 is also configured to detect landmarks and occlusion information for those landmarks (e.g., physical occlusions present in input video).

With regard to level-of-detail (LOD) and implementation of B-Net processing, several factors can influence whether B-Net is chosen at decision 314 of FIG. 3. The management of the LOD is based on the type of device it is running on, on the current conditions of the device and the current performance of the face detection model.

Devices with enough compute performance can run on the highest LOD level, e.g., by running both A-Net and B-Net. The performance of the face detection model can be monitored and if the frames per second (FPS) degrades over a certain level B-Net may be bypassed. The LOD can also be lowered if the battery of the device falls under a certain threshold, in order to preserve energy. Furthermore, signals measuring secondary effects on hardware utilization such as CPU temperature can be taken into account to determine the LOD level and correspondingly, whether the B-Net is utilized.

There might also be certain devices that given their compute budget are restricted to implementation of A-Net only. This can be done by one or more of a predefined list of devices and/or an online estimation of facial tracker performance.

In case of running only with A-Net, if the quality of the predictions falls under a certain value while already bypassing B-Net, it may be determined that the FACS controls regressed are not of enough quality and instead only a head pose may be provided, with fixed or predetermined FACS weights.

Figure 6:
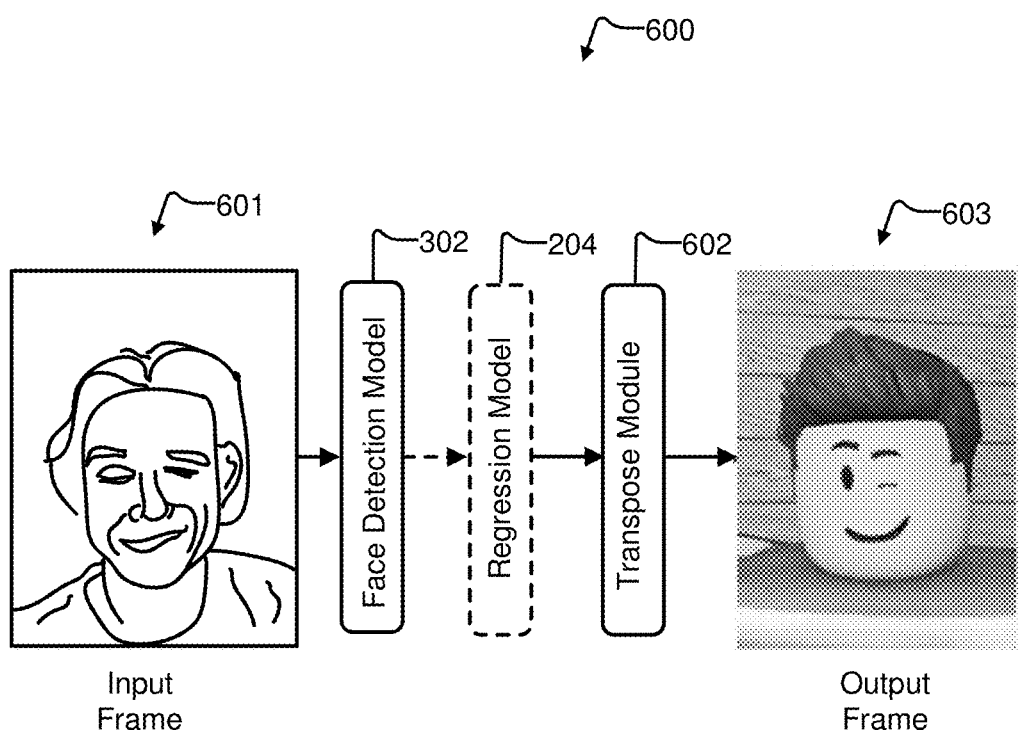
FIG. 6 is a simplified process flow diagram of a regression model and face detection model configured to create a robust animation, in accordance with some implementations.

Using A-Net 312 and/or B-Net 316 (which also include the regression model 204), a sequence of output frames for animation of an avatar are generated based upon input video frames provided to the models. FIG. 6 is an example of a simplified process flow diagram of a regression model and face detection model configured to create a robust animation, in accordance with some implementations. As shown, input frame 601 may be analyzed and facial landmarks extracted, such that output frame 603 is generated through a transpose module 602, based upon movements, gestures, and other features of the face present in input frame 601. The transpose module may be associated with the facial animation engine 107 and/or VE applications 112/118. It is noted that any avatar that can be manipulated based upon FACS weights and facial landmarks may be animated using these techniques. Accordingly, while a humanoid output frame is illustrated, any variation of output is possible, and is within the scope of example embodiments of the present disclosure.

Hereinafter, a more detailed discussion of generating animations using the models described above, is presented below.

Figure 7:
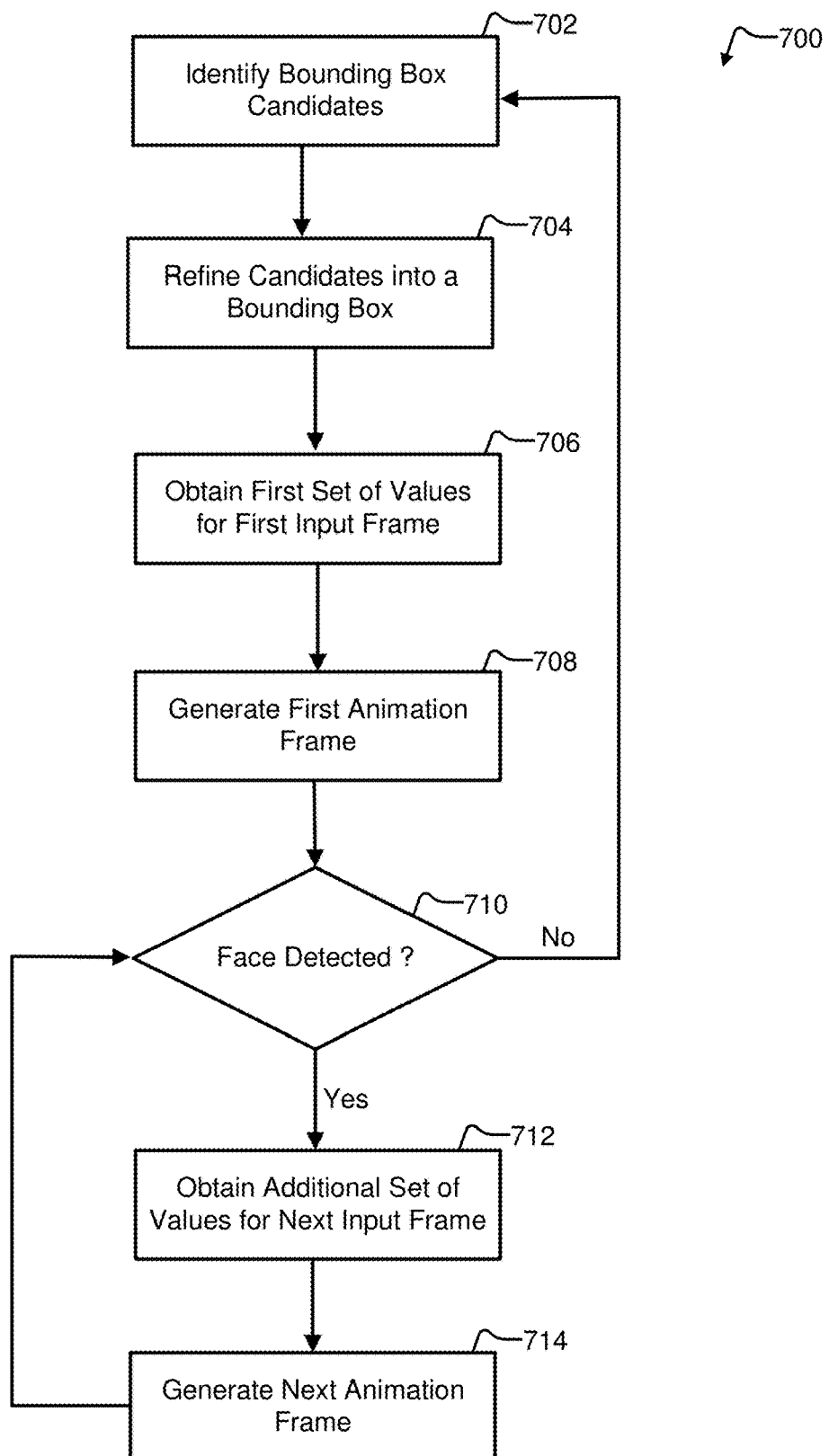
FIG. 7 is a flowchart of an example method of real-time robust facial animation from video, in accordance with some implementations.

FIG. 7: Animating an Avatar with Trained Models

FIG. 7 is a flowchart of an example method 700 of real-time robust facial animation from video, in accordance with some implementations. In some implementations, method 700 can be implemented, for example, on a server system, e.g., online virtual experience platform 102 as shown in FIG. 1. In some implementations, some or all of the method 700 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 700.

To provide avatar animation, a face from an input video may be detected and facial landmarks, head pose, tongue status, etc. may be determined and utilized to animate the face of a corresponding avatar. Prior to performing face detection or analysis, the user is provided an indication that such techniques are utilized for avatar animation. If the user denies permission, facial animation based on video is turned off (e.g., default animation may be used, or animation may be based on other user-permitted inputs such as audio and/or text input provided by the user). The user provided video is utilized specifically for avatar animation and is not stored. The user can turn off video analysis and animation generation at any time. Further, facial detection is performed to detect a position of the face within the video; no facial recognition is performed. If the user permits use of video analysis for avatar animation, method 700 begins at block 702.

At block 702, a fully convolutional network is used to identify a set of bounding box candidates from a first frame of a video. Each bounding box candidate includes a face from the first frame of the video. For example, the video may be captured by a user device (e.g., 110, 116) in operative communication with an online virtual experience platform 102. The user associated with the client device may present their face for capture via a camera component, and allow access to the video by a virtual experience application (or other facial animation application) on their device. The virtual experience application (or other facial animation application) may implement both a face detection model 302 and a regression model 204 (which can be implemented as an A-Net 312 or B-Net 316), as described above. Block 702 is followed by block 704.

At block 704, the set of bounding box candidates is refined into a bounding box using a convolutional neural network. For example, and as described above with reference to FIG. 3, P-Net 308 may provide the bounding box candidates to R-Net 310, where the candidates are refined into a bounding box for use by the face detection model 302. Block 704 is followed by block 706.

At block 706, a first set of one or more of a predefined facial expression weight, a head pose, and facial landmarks based on the bounding box and the first frame are obtained using an overloaded output convolutional neural network. For example, the overloaded output convolutional network may include A-Net 312 only, in some implementations. In other implementations, the overloaded output convolutional network may include both A-Net 312 and B-Net 316. A decision on whether to use B-Net in combination with A-Net may be based on a plurality of factors, including, but not limited to, user preferences, system administrator preferences, available computing resources, available memory, anticipated or realized frame rate, network conditions, and other factors. Block 706 is followed by block 708.

At block 708, a first animation frame of an animation of a three dimensional (3D) avatar based on the first set of the one or more of the predefined facial expression weight, the head pose, and the facial landmarks, is generated. In general, the head pose of the avatar matches the head pose in the first set and facial landmarks of the avatar match the facial landmarks in the first set. Furthermore, the animation frame is created based upon the trained regression model receiving and processing the predicted values output by the overloaded output convolutional network. Thus, the regression model 204 may provide the final weights for animation of the avatar in some implementations. Block 708 is followed by block 710.

At block 710, a determination is made as to whether a face is detected for each additional frame of the video subsequent to the first frame. If it is detected that the bounding box includes the face, block 712 comprises obtaining an additional set of the one or more predefined facial expression weights, head poses, and facial landmarks based on the bounding box and the additional frame, using the overloaded output convolutional neural network. Furthermore, block 714 comprises generating an additional animation frame of the animation of the 3D avatar using the additional set.

However, if at block 710, and in each additional frame of the video subsequent to the first frame, if it is detected that the bounding box does not include the face, the method 700 includes repeating the identifying (702), refining (704), and obtaining (706) based on a new bounding box containing the face. In this regard, P-Net 308 and R-Net 310 are used again if a face is not detected. Accordingly, the method 700 includes, if it is detected that the bounding box for the additional frame does not include the face, setting the additional frame as the first frame and repeating steps as described above.

Blocks 702-714 can be performed (or repeated) in a different order than described above and/or one or more blocks can be omitted. Method 700 can be performed on a server (e.g., 102) and/or a client device (e.g., 110 or 116). Furthermore, portions of the method 700 may be combined and performed in sequence or in parallel, according to any desired implementation.

As described above, the techniques of robust facial animation include implementation of a trained face detection model and a trained regression model at a client device. The face detection model may include two or more intelligent decision components that automatically reduce computation resources used by bypassing bounding box creation for frames where a face is detected subsequent to a first frame, and bypassing a higher level of detail output network (e.g., bypassing B-Net) depending upon user preferences and/or device conditions.

Hereinafter, a more detailed description of various computing devices that may be used to implement different devices and components illustrated in FIGS. 1-6 is provided with reference to FIG. 8.

Figure 8:
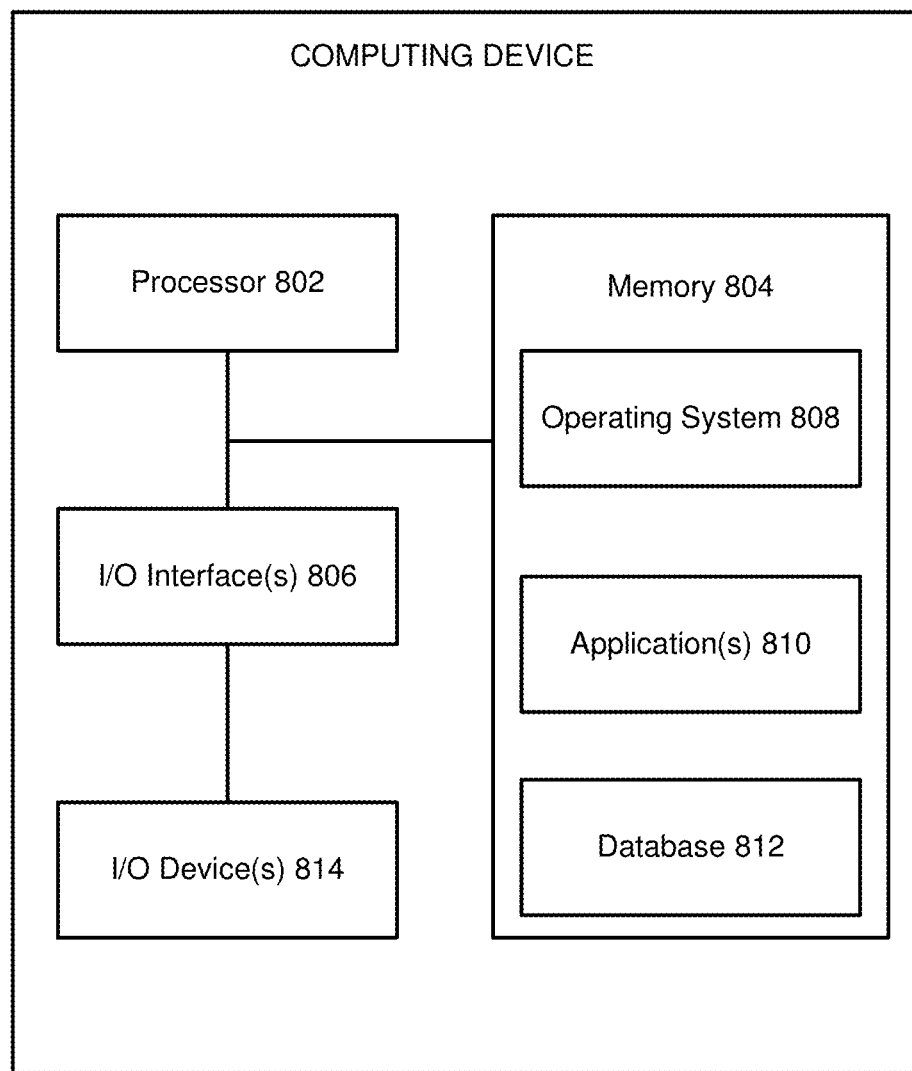
FIG. 8 is a block diagram illustrating an example computing device which may be used to implement one or more features described herein, in accordance with some implementations.

FIG. 8 is a block diagram of an example computing device 800 which may be used to implement one or more features described herein, in accordance with some implementations. In one example, device 800 may be used to implement a computer device, (e.g., 102, 110, and/or 116 of FIG. 1), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, an application 810 and associated data 812. In some implementations, the application 810 can include instructions that enable processor 802 to perform the functions described herein, e.g., some or all of the methods of FIG. 7. In some implementations, the application 810 may also include one or more trained models for generating robust real-time animation based on input video, as described herein.

For example, memory 804 can include software instructions for an application 810 that can provide animated avatars based on a user's facial movements caught on camera, within an online virtual experience platform (e.g., 102). Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 108), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, software blocks 808 and 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While the online virtual experience platform 102 is described as performing operations as described in some implementations herein, any suitable component or combination of components of online virtual experience platform 102 or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 600 and/or 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which certain implementations discussed herein may obtain or use user data (e.g., images of users, user demographics, user behavioral data on the platform, user search history, items purchased and/or viewed, user's friendships on the platform, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
   identifying, using a fully convolutional network, a set of bounding box candidates from a first frame of a video, wherein each bounding box candidate includes a face;
   refining, using a convolutional neural network, the set of bounding box candidates into a bounding box;
   obtaining a first set of one or more of a predefined facial expression weight, a head pose, and facial landmarks based on the bounding box and the first frame using an overloaded output convolutional neural network;
   generating a first animation frame of an animation of a three-dimensional (3D) avatar based on the first set of the one or more of the predefined facial expression weight, the head pose, and the facial landmarks, wherein a head pose of the avatar matches the head pose in the first set and facial landmarks of the avatar match the facial landmarks in the first set; and
   for each additional frame of the video subsequent to the first frame,
      detecting whether the bounding box, applied to the additional frame, includes the face;
      if it is detected that the bounding box includes the face, bypassing the fully convolutional network and the convolutional neural network, and obtaining an additional set of the one or more predefined facial expression weights, head poses, and facial landmarks based on the bounding box and the additional frame, by using the overloaded output convolutional neural network; and
      generating an additional animation frame of the animation of the 3D avatar using the additional set.

2. The computer-implemented method of claim 1, wherein, if it is detected that the bounding box for the additional frame does not include the face, setting the additional frame as the first frame.

3. The computer-implemented method of claim 1, further comprising identifying, by the overloaded output convolutional neural network, a tongue out condition wherein a tongue is detected in the face.

4. The computer-implemented method of claim 3, wherein identifying the tongue out condition is based on sub-model of the overloaded output convolutional neural network.

5. The computer-implemented method of claim 1, wherein the overloaded output convolutional network is a first neural network, the method further comprising refining the first set of one or more of the predefined facial expression weight, the head pose, and the facial landmarks based on the bounding box and the first frame using an additional overloaded output convolutional neural network.

6. The computer-implemented method of claim 5, wherein the additional overloaded output convolutional neural network provides a higher level of detail as compared to the first neural network.

7. The computer-implemented method of claim 5, further comprising identifying, by the additional overloaded output convolutional neural network, a tongue out condition wherein a tongue is detected in the face.

8. The computer-implemented method of claim 5, wherein an input frame resolution of the first neural network is less than an input frame resolution of the additional overloaded output convolutional neural network.

9. The computer-implemented method of claim 1, wherein the overloaded output convolutional neural network is trained on a set of artificially generated input frames of an artificial video.

10. The computer-implemented method of claim 9, wherein the overloaded output convolutional neural network is further trained with a set of real images that are hand-labeled.

11. A system comprising:
    a memory with instructions stored thereon; and
    a processing device, coupled to the memory, the processing device configured to access the memory and execute the instructions, wherein the instructions cause the processing device to perform operations comprising:

identifying, using a fully convolutional network, a set of bounding box candidates from a first frame of a video, wherein each bounding box candidate includes a face;

refining, using a convolutional neural network, the set of bounding box candidates into a bounding box;

obtaining a first set of one or more of a predefined facial expression weight, a head pose, and facial landmarks based on the bounding box and the first frame using an overloaded output convolutional neural network;

generating a first animation frame of an animation of a three-dimensional (3D) avatar based on the first set of the one or more of the predefined facial expression weight, the head pose, and the facial landmarks, wherein a head pose of the avatar matches the head pose in the first set and facial landmarks of the avatar match the facial landmarks in the first set; and for each additional frame of the video subsequent to the first frame,
  detecting whether the bounding box, applied to the additional frame, includes the face;
  if it is detected that the bounding box includes the face, bypassing the fully convolutional network and the convolutional neural network, and obtaining an additional set of the one or more predefined facial expression weights, head poses, and facial landmarks based on the bounding box and the additional frame, by using the overloaded output convolutional neural network; and
  generating an additional animation frame of the animation of the 3D avatar using the additional set.

12. The system of claim 11, wherein, if it is detected that the bounding box for the additional frame does not include the face, setting the additional frame as the first frame.

13. The system of claim 11, wherein the operations further comprise identifying, by the overloaded output convolutional neural network, a tongue out condition wherein a tongue is detected in the face.

14. The system of claim 11, wherein the overloaded output convolutional network is a first neural network, the operations further comprising additionally refining the first set of one or more of the predefined facial expression weight, the head pose, and facial landmarks based on the bounding box and the first frame using an additional overloaded output convolutional neural network.

15. The system of claim 14, wherein the additional overloaded output convolutional neural network provides a higher level of detail as compared to the first neural network.

16. A non-transitory computer-readable medium with instructions stored thereon that, responsive to execution by a processing device, causes the processing device to perform operations comprising:

identifying, using a fully convolutional network, a set of bounding box candidates from a first frame of a video, wherein each bounding box candidate includes a face;

refining, using a convolutional neural network, the set of bounding box candidates into a bounding box;

obtaining a first set of one or more of a predefined facial expression weight, a head pose, and facial landmarks based on the bounding box and the first frame using an overloaded output convolutional neural network;

generating a first animation frame of an animation of a three dimensional (3D) avatar based on the first set of the one or more of the predefined facial expression weight, the head pose, and the facial landmarks, wherein a head pose of the avatar matches the head pose in the first set and facial landmarks of the avatar match the facial landmarks in the first set; and for each additional frame of the video subsequent to the first frame,
  detecting whether the bounding box, applied to the additional frame, includes the face;
  if it is detected that the bounding box includes the face, bypassing the fully convolutional network and the convolutional neural network, and obtaining an additional set of the one or more predefined facial expression weights, head poses, and facial landmarks based on the bounding box and the additional frame, by using the overloaded output convolutional neural network; and
  generating an additional animation frame of the animation of the 3D avatar using the additional set.

17. The non-transitory computer-readable medium of claim 16, wherein, if it is detected that the bounding box for the additional frame does not include the face, setting the additional frame as the first frame.

18. The non-transitory computer-readable medium of claim 16, wherein the operations further comprise identifying, by the overloaded output convolutional neural network, a tongue out condition wherein a tongue is detected in the face.

19. The non-transitory computer-readable medium of claim 16, wherein the overloaded output convolutional network is a first neural network, the operations further comprising additionally refining the first set of one or more of the predefined facial expression weight, the head pose, and facial landmarks based on the bounding box and the first frame using an additional overloaded output convolutional neural network.

20. The non-transitory computer-readable medium of claim 19, wherein the additional overloaded output convolutional neural network provides a higher level of detail as compared to the first neural network.

* * * * *